Figures 1, 2, 3:
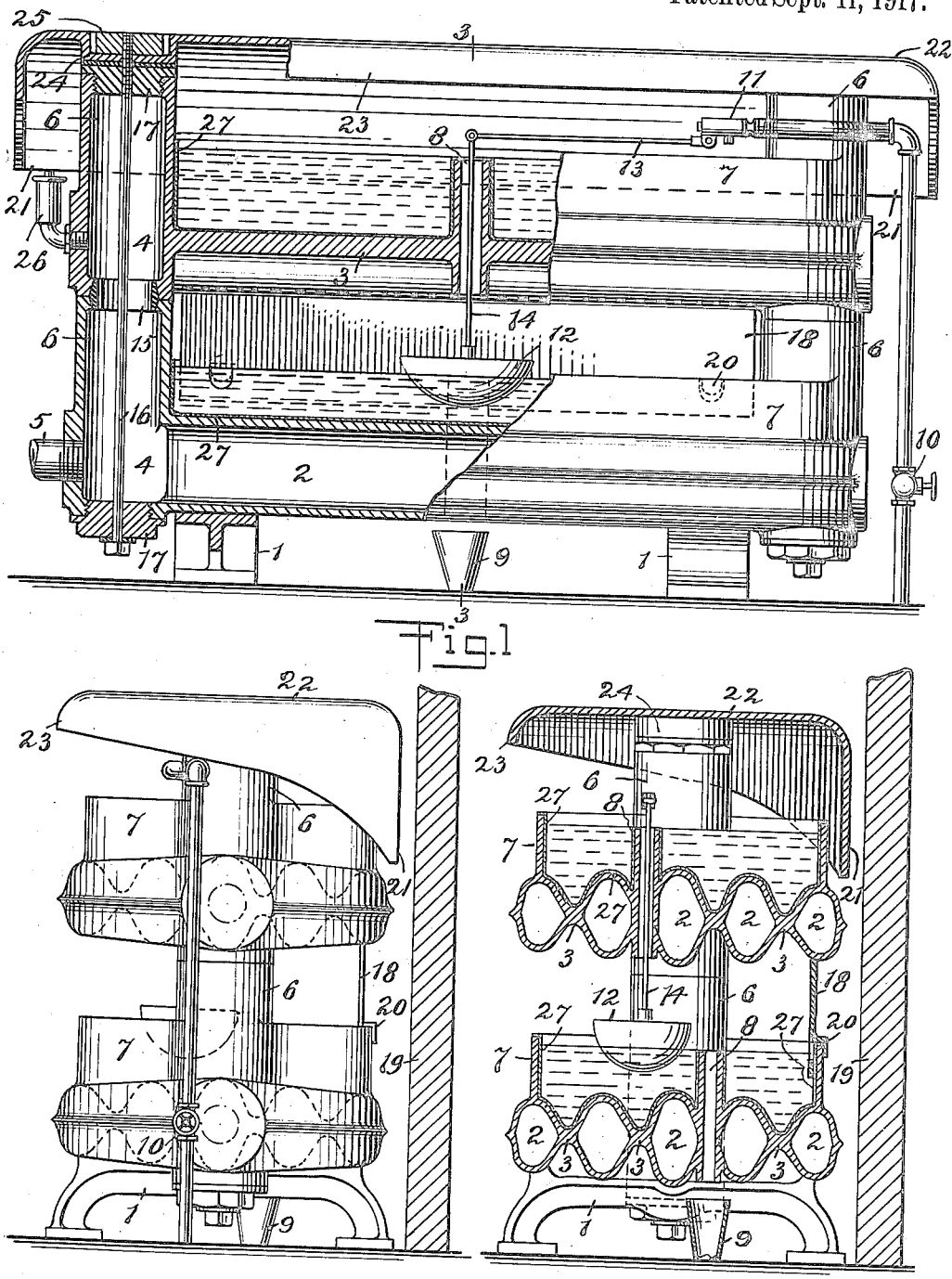

R. W. HARDIE.
AIR MOISTENER.
APPLICATION FILED SEPT. 2, 1916.

1,239,908.

Patented Sept. 11, 1917.

Inventor:
Robert W. Hardie.

UNITED STATES PATENT OFFICE.

ROBERT W. HARDIE, OF WHITE PLAINS, NEW YORK.

AIR-MOISTENER.

1,239,908.　　　　　Specification of Letters Patent.　　Patented Sept. 11, 1917.

Application filed September 2, 1916. Serial No. 118,258.

*To all whom it may concern:*

Be it known that I, ROBERT W. HARDIE, a citizen of the United States, residing at the city of White Plains, in the county of Westchester and State of New York, have invented new and useful Improvements in Air-Moisteners, of which the following is a specification.

My invention relates to air moisteners designed to be used in connection with steam or hot water as a heating medium, and has for its principal object to provide a device adapted to supply moisture to the atmosphere of the room in which it is used and thereby overcome the difficulties and injurious effects now commonly experienced, especially with steam heat, due to the low percentage of humidity in the atmosphere.

To that end the invention comprises primarily an open receptacle adapted to contain water, and a heating member in coöperation therewith designed to convert the water of the receptacle into vapor of water in the most facile manner, as hereinafter described, and illustrated in the accompanying drawings which show one embodiment of the invention.

In the drawings, in which similar reference symbols indicate corresponding parts throughout the several views, Figure 1 represents partly in side elevation, and partly in vertical longitudinal section, an air moistener embodying my invention.

Fig. 2 is an end elevation of the device shown in Fig. 1, and Fig. 3 is a vertical cross section taken on the line 3—3 of Fig. 1.

The drawings illustrate an air moistener having two superposed sections, each having a heat radiating member, and a water bearing receptacle. The number of sections used is not an essential part of my invention, however; that depends on the amount of heat and humidity that is desired to be produced.

In most instances one heating member and one receptacle will be sufficient, but if desired one receptacle may be used with a main heating member in direct coöperation therewith, and an auxiliary heating member positioned above said receptacle.

The device is provided with a supporting base or legs, 1, of any suitable construction, upon which is mounted a heating member, having preferably a plurality of horizontal conduits or heat radiating conductors, 2, connected by intermediate ribs, 3, to make the upper surface of the heating member continuous and serve as the bottom of a receptacle. The ends of the conduits, 3, are connected with terminal chambers, 4, that receive the heating medium, and distribute it into the conduits, 2, and one of the chambers, 4, is provided with a supply pipe, 5, through which the heating medium, steam, vapor or hot water is admitted to the chambers, 4.

The end chambers, 4, are extended upward from the ends of the conduits, 2, to form heating chambers, 6, and also to provide room for air to accumulate in, especially when the device is to be used with hot water as a heating medium, and thereby prevent air from accumulating in the conduits. As shown in the drawing, the heating chambers, 6, are cylindrical in cross section so as to provide an extended heating surface for the water in the receptacle, and so increase the heating area exposed to the water; but the form of the heating chamber may be modified if desired.

As illustrated in the drawing, a single pipe is used for the inlet and discharge pipe, as in a one pipe system, but if desired the opposite end of the heating member may be provided with a corresponding pipe, one to be used as the feed pipe and the other as the discharge pipe, as in a two pipe system.

Oppositely disposed flanges, 7, are shown formed on the heating member and connected at their ends with the walls of the heating chambers, 6, to form a receptacle for holding water. By means of such construction the upper surface of the walls of the conduits or conductors 2, and the inner walls of the end heating chambers 6 are exposed to the interior of the receptacle and to the water contained therein, so as to enable the heat radiated from said walls to quickly evaporate, or convert into watery vapor, the water in the receptacle.

The end heating chambers are especially effective, for the reason that, by extending upward from the conduits they radiate heat directly into the water in the receptacle through the full depth of the water at the ends of the receptacle, and produce upward currents of heated water that promote rapid evaporation of the water at those parts and aid in bringing the less heated water from the upper part of the receptacle into contact or effective relation with the conduits at the bottom of the receptacle. It is not essential that the upper surface of the heating member be made continuous transversely of its width, especially in cases where a second or additional heating member is used over the receptacle to radiate heat onto the surface of the water in the receptacle and produce a heated atmosphere directly above the receptacle to absorb and dissipate the watery vapor arising from the receptacle. In such cases the watery vapor may pass up through the spaces left between the conduits of the upper heating member and become heated by the conduits and absorbed by the atmosphere. It is not essential that the upper surface of said heating member serve as the bottom of a tray, nor is it essential that the upper surface of said member be corrugated.

The number of conduits or heat radiating conductors provided for the receptacle is not material and in some instances, especially small devices, one conduit may be used.

Water is supplied to the receptacle through a supply pipe preferably having a valve 10, and from the supply pipe the water passes through a ball cock 11 operated by a float 12 which in the construction illustrated is connected with the valve operating lever 13 by means of an intermediate link 14. The intermediate link is not necessary however where only one heating member is used. In such case the float 12 may be connected directly with the operating lever 13.

In the construction shown, the water supply of two receptacles may be controlled by one ball cock, by inserting the connecting rod 14 through the overflow 8 of the upper receptacle or similar opening through the receptacle and heating member.

As water is supplied to the upper receptacle by the ball cock 11 the receptacle fills with water up to the top of the overflow and through said overflow into the lower receptacle and when the water in the lower receptacle reaches a predetermined level the float 12 rises and closes the supply of water from the ball cock.

Where two or more sections are used each comprising a heating member and a receptacle the sections may be all of the same construction, one superposed on another and provided with a bushing 15, with the ends of the sections secured together by means of a bolt 16 that engages and binds threaded plugs 17 to their respective sections.

The back of the receptacle may if desired be provided with a shield 18 to prevent the moistened air from passing backward and condensing on the wall 19 of a building, when the device is placed near a wall. The shield may be of any construction suitable for that purpose and may be supported on the flange 7 by means of lips 20 offset from the marginal portion of said shield, so as to engage said flange.

In an air moistener having but one heating member and one receptacle the moistened air may be prevented from condensing on an adjacent wall by means of a bonnet or hood having a flange 21 that extends below the upper edge of the flange of the receptacle and resists a backward movement of the moistened air.

The lower margin of the flange 21 is offset from the wall of the receptacle so as to permit a current of air to pass upward between the wall or flange 21 and the flange of the receptacle, thereby forcing the moistened air outward from above the front of the receptacle into the atmosphere.

The upper wall or plate 22 of said hood serves as a deflecting plate and enables the air current passing up between the wall 21 of the hood and the flange of the receptacle to carry the moistened air forward and away from the receptacle, and if desired the downwardly projecting flange 23 formed on the front of said hood may be cut away to permit a free movement of the moistened air out from the front of the receptacle.

The hood may be mounted upon the cylindrical hubs on the ends of the heating member by means of the bolt 16 and the hood may be depressed to make a pocket or recess 24 adapted to receive a nut 25 threaded to the end of said bolt so as to make the upper surface of said nut flush with the upper surface of said hood. The hood may be dispensed with even when a single heating member and receptacle are used, or a hood of different construction may be used if desired.

The heating member may be vented by means of an air valve 26 opening into the terminal chamber 4.

A tray 27 independent of the heating member may be provided, and if preferred made of non-corrosive material and formed on the bottom to conform to the shape of the upper surface of the heating member.

When the device is in use, the valve 10 is open, and if there is no water in the receptacle or not enough to raise the float 12, water will continue to flow into the receptacle until the float rises and shuts off the supply through the ball cock 11.

The heating medium, steam or hot water, passes through the supply pipe 5 into the interior of the heating member conveying heat to the water in the receptacle or trays, converting said water into vapor, diffusing it into the atmosphere of the room and raising the percentage of humidity therein to the desired extent. As the water is converted into vapor additional water is fed into the receptacle automatically by the float operated ball-cock thus maintaining an approximately uniform quantity of water in the receptacle. The ball cock permits a small quantity of water to be continuously fed into the receptacle and in that way the temperature of the water is not affected or reduced by letting in a large quantity of water at one time.

What I claim as new and desire to secure by Letters Patent is—

1. In an air moistener, the combination of an open horizontal receptacle, a heating member having a heat radiating conductor forming the bottom of said receptacle, and a heating chamber at each end of said receptacle forming the end walls of said receptacle and communicating with and extending above said conductor, whereby heat is radiated from the upper wall of said conductor and the inner walls of said chambers directly into the water in said receptacle.

2. In an air moistener, the combination of an open receptacle, a main heating member having a horizontal heat radiating conductor extending along the bottom of said receptacle and a heating chamber at each end of said receptacle extending above and communicating with said conductor, the upper wall of said conductor and the inner walls of said heating chambers being exposed to the interior of said receptacle, and an auxiliary heating member arranged above said receptacle having its ends connected with the interior of the corresponding heating chambers of the main heating member.

3. In an air moistener, a heating member provided with a plurality of horizontal heat radiating conductors connected by intermediate ribs, and with a heating chamber at each end of said conductors extending above and communicating therewith, and oppositely disposed flanges formed with the upper surface of said heating member and the vertical walls of said heating chambers, said flanges extending upwardly, to form with said upper surface and walls, a receptacle from which water is evaporated by the heating member.

4. In an air moistener, the combination of an open receptacle, a main heating member having a horizontal heat radiating conductor extending along the bottom of said receptacle and a heating chamber at each end of said receptacle extending above and communicating with said conductor, the upper wall of said conductor, and the inner vertical walls of said heating chambers being exposed to the interior of said receptacle, an auxiliary heating member provided with a plurality of horizontal conduits and an end chamber at each end of said conduits communicating with said conduits, and means for connecting the end chambers of said auxiliary heating member with the corresponding end heating chambers of the main heating member.

ROBERT W. HARDIE.

Witnesses:
B. E. SMYTHE,
JOHN A. SCHELZ.